(No Model.) 2 Sheets—Sheet 1.

Z. F. NANCE.
COTTON CLEANER AND GIN FEEDER.

No. 287,153. Patented Oct. 23, 1883.

Witnesses:
C. J. Belt
A. M. Tanner

Inventor
Zachariah F. Nance,
By Palmer & Co,
Attorneys (No Model.) 2 Sheets—Sheet 2.
Z. F. NANCE.
COTTON CLEANER AND GIN FEEDER.
No. 287,153. Patented Oct. 23, 1883.
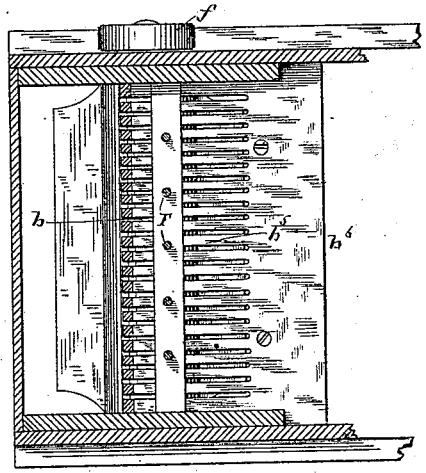
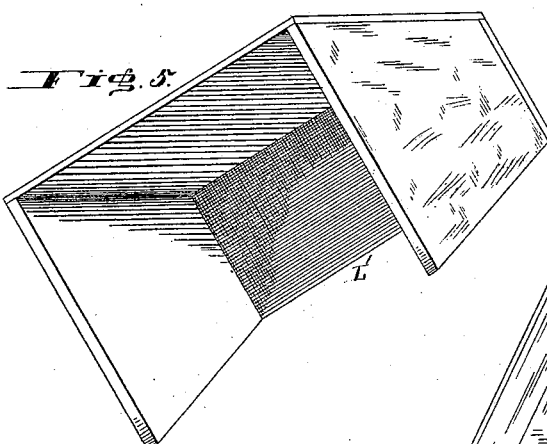
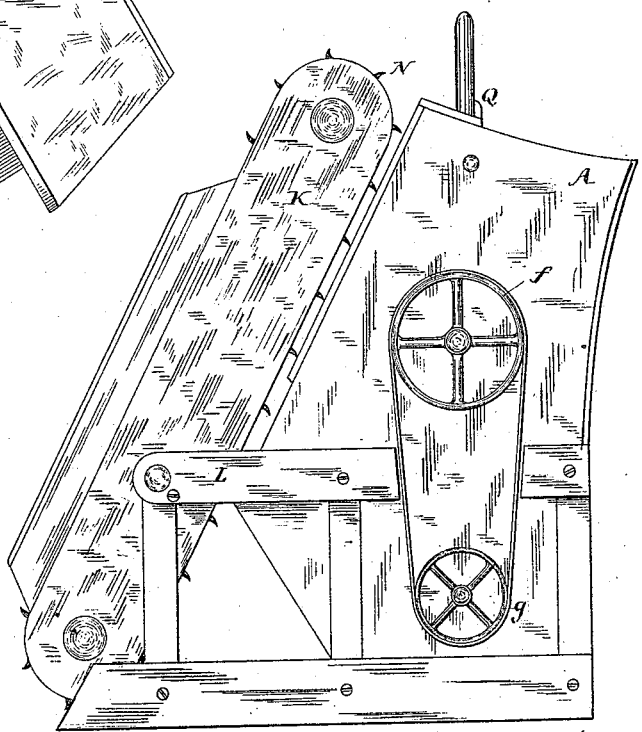
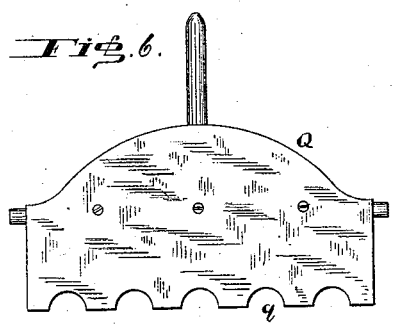
Witnesses:
C. T. Belt
A. M. Tanner
Inventor
Zachariah F. Nance,
By Painer Lood,
Attorneys

UNITED STATES PATENT OFFICE.

ZACHARIAH F. NANCE, OF EUFAULA, ALABAMA.

COTTON-CLEANER AND GIN-FEEDER.

SPECIFICATION forming part of Letters Patent No. 287,153, dated October 23, 1883.

Application filed June 18, 1883. (No model.)

*To all whom it may concern:*

Be it known that I, ZACHARIAH F. NANCE, a citizen of the United States, residing at Eufaula, in the county of Barbour and State of Alabama, have invented certain new and useful Improvements in Cotton-Cleaners and Gin-Feeders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to machines for separating trash, dust, dirt, or other foreign material from cotton and delivering the latter to the gin in a clean condition.

The object of the invention is to provide a cotton cleaner and feeder in which the component parts are so constructed and relatively arranged that all impurities are withdrawn from the cotton by the action of an exhaust-fan, which induces a current of air through a cleaning-chamber containing a slotted or open concave bed, having teeth which intermesh with the teeth of a toothed cylinder, said fan being arranged below the concave bed in a trunk or box open at its lower end. The feed of the cotton into the cleaner is controlled by a pivoted gate arranged at one side of the hopper, and having notches for the passage of the teeth of the cleaning-cylinder. The devices for delivering the cleaned cotton to the gin consists of a pivoted frame and an endless apron having spikes or teeth, the apron-frame being mounted on the cleaner casing or frame, and combined with devices for holding it in an angular position in relation to the cleaner-casing, which devices, when removed, permit the apron-frame to be folded or turned back upon the cleaner-casing.

Figure 1:
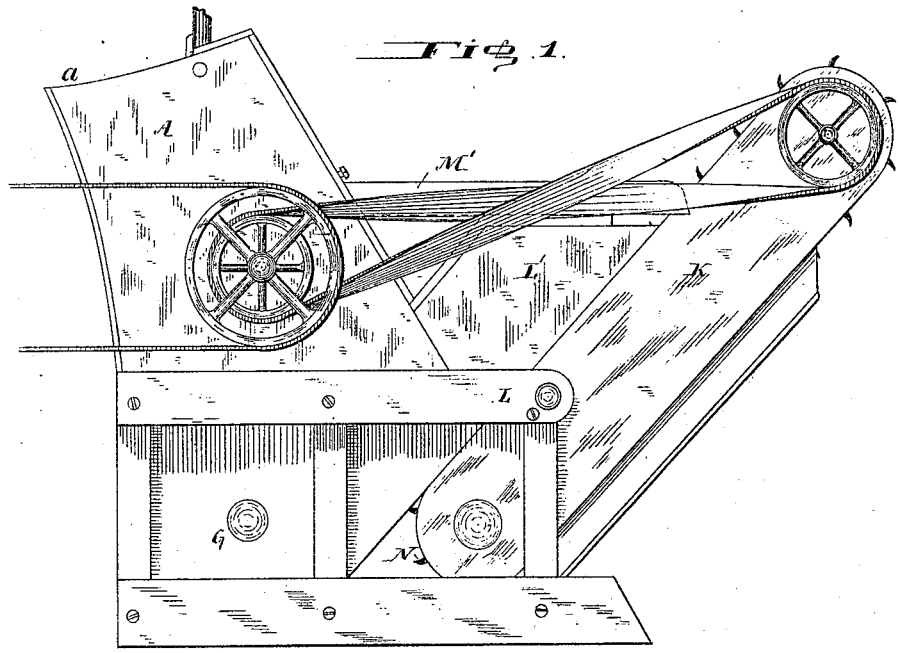
Figure 2:
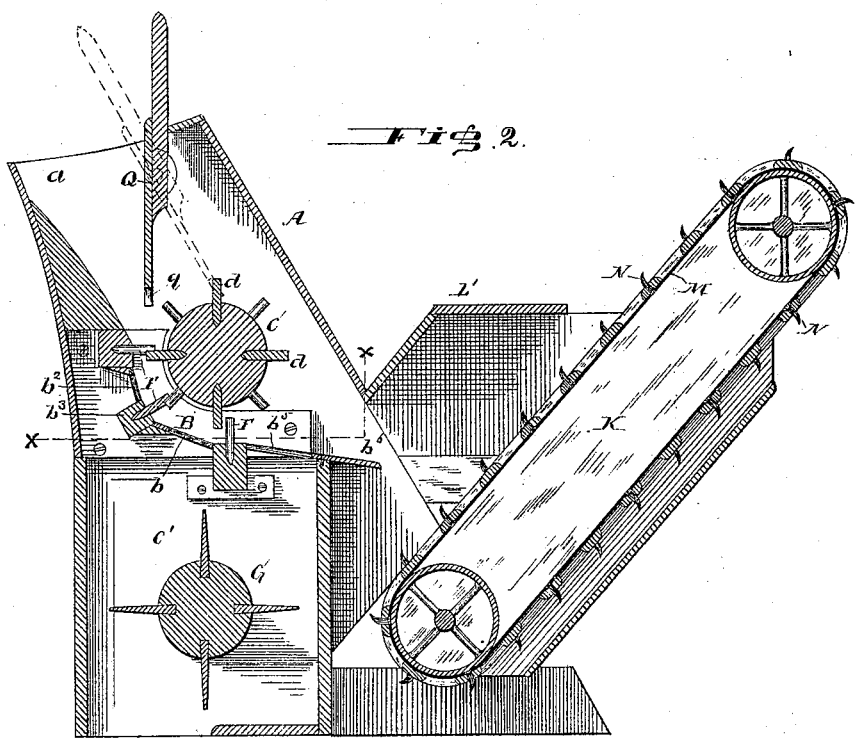

In the drawings, Figure 1 is a side elevation of a machine constructed according to my invention. Fig. 2 is a vertical longitudinal section of the same. Fig. 3 is a transverse horizontal section taken through the cleaner-casing on the line $x\,x$ of Fig. 2. Fig. 4 represents the machine with the apron-frame turned back upon the cleaner-casing, and Figs. 5 and 6 are detached views of the box L and the gate Q, respectively.

The letter A designates a frame or casing, which has a feed-hopper, $a$, at its front end, a concave bed, B, extending from front to rear and from side to side, and a chamber or air-trunk, $c'$, below said concave bed. A horizontal cylinder, C, studded with spirally-arranged teeth or fingers $d$, has its bearings in the sides of the casing, and operates above the concave bed B. This bed is formed of a vertical end grate, $b^2$, attached at its upper end to the front wall of the chamber, and at its lower end to an angular transverse bar, $b^3$, having its faces or sides arranged so as to present angular surfaces and leave a space between the same and the front wall of the box. From the bottom of this bar $b^3$ extends an inclined grate, $b$, which joins a third horizontal grate, $b^5$, leading into the discharge-flue $b^6$. These various grates or plates, having slots or apertures, constitute the curved bed above which the toothed roller operates. Rows of teeth F, arranged on the bars of said concave bed, pass between the teeth of the cylinder, and serve as means for beating, separating, or loosening the cotton.

In the chamber or trunk arranged below the concave bed I locate a fan, G, which is driven in such a manner that a downward draft or current of air is induced through the cleaning-chamber, the openings in the concave bed permitting the dirt, trash, and other foreign material present in the cotton to pass into the fan-chamber. This fan-chamber being open at its bottom and arranged over a hole in the gin-room floor, it follows that all foreign matter removed by the concave beater and fan are deposited at a suitable place away from the machine.

The shaft of the toothed cylinder has a main driving-pulley or crank-arm, for operating it by machine or hand power, and also carries a pulley, $f$, for communicating motion to a pulley, $g$, on the fan-shaft, a suitable belt passing over both.

The means for conveying the cotton from the cleaner to the gin consists of a frame or trough, K, which is pivoted at a point above its lower end to arms L, projecting from the cleaner-casing, and it contains an endless apron, M, having toothed slats N. This belt passes over rollers journaled in the ends of the frame K, and it is driven by means of a belt-and-pulley connection with the shaft of the cleaning or toothed cylinder. The apron-frame is arranged at an angle of about forty-five degrees in relation to the cleaner-casing, so that the cotton will be elevated and delivered into the hopper of the gin. The endless apron extends below and in front of the discharge end of the flue $b^6$, and receives the cotton passing out of said flue upon its teeth, which are hooked or bent in an upward direction, so as to retain the cotton during the upward passage of the apron.

The apron-frame is held in the position shown in Fig. 1 by means of a detachable box, L', which fits in the space or angle formed between the apron-frame and rear wall of the cleaner-casing, and prevents the movement of the apron-frame by acting as a stop, which will not allow said frame to turn on its pivot. The box itself is held in place by means of a presser-bar, M', which is passed over the top thereof, and engages with notches, pins, or other stop-surfaces on the apron-frame and cleaner-casing. The box L' is open at its bottom and lower end, so as to fit over the apron and discharge-flue of the cleaner. When the machine is not in use, the box and presser-bar are removed, so as to permit the apron-frame to be turned or folded back upon the cleaner-casing, as is shown in Fig. 4. When in this position the parts occupy less space in storage and transportation, and access can be conveniently had to the lower portion of the apron. Again, referring to the feed-hopper of the cleaner, it will be perceived that it contains a gate or movable board, Q, which has trunnions or pivots turning in the side walls of the hopper; or fixed pivots may enter said board. The lower edge of the board has notches $q$, for the passage of the teeth of the cylinder. A lever-handle on the board or gate will permit the same to be turned, so as to set it at different angles in relation to the roller or front of the hopper, for increasing or diminishing the size of the feed opening or mouth.

Having thus described my invention, what I claim as new, and desire to secure by Letters Patent, is—

1. In a cotton cleaner and feeder, the combination of the concave or curved bed, composed of the grates $b\ b^2\ b^5$ and toothed bars $b^3$ F, the hopper $a$, horizontal discharge-flue $b^6$, and suction-chamber $c'$, and fan G, arranged directly beneath the concave or curved bed, with the toothed cylinder C $d$ and devices for conveying the cotton from the cleaning-chamber to the gin, as herein set forth.

2. In a cotton cleaner and feeder, the combination of the inclined pivoted apron-frame K and the endless toothed apron M N, mounted therein, the cleaner-casing A, having the arms or supports L for the apron-frame, and means interposed between the latter and the cleaner-casing for holding the apron-frame in a stationary position, substantially as herein set forth.

3. In a cotton cleaner and feeder, the combination of the removable angular box and presser-bar with the cleaner-casing, and the pivoted frame carrying the conveyer-apron, substantially as herein set forth.

In testimony whereof I affix my signature in presence of two witnesses.

ZACHARIAH F. NANCE.

Witnesses:
T. W. OLIVER,
ROBT. F. NANCE.